US00RE34102E

United States Patent [19]

Cole et al.

[11] E Patent Number: Re. 34,102

[45] Reissued Date of Patent: Oct. 20, 1992

[54] THRUST PRODUCING SHOE SOLE AND HEEL

[75] Inventors: George S. Cole, Pebble Beach; Karl M. Schmidt, Mountain View, both of Calif.

[73] Assignee: Energaire Corporation, Pebble Beach, Calif.

[21] Appl. No.: 699,757

[22] Filed: May 14, 1991

Related U.S. Patent Documents

Reissue of:

[64] Patent No.: 4,237,625
Issued: Dec. 9, 1980
Appl. No.: 943,053
Filed: Sep. 18, 1978

[51] Int. Cl.[5] ..... A43B 13/18

[52] U.S. Cl. ..... 36/28; 36/29; 36/35 B

[58] Field of Search ..... 36/28, 29, 35 R, 35 B, 36/3 R, 3 B, 30

[56] References Cited

U.S. PATENT DOCUMENTS

| | | | |
|---|---|---|---|
| 508,034 | 11/1893 | Moore | 36/29 |
| 547,645 | 10/1895 | Lacroix | 36/29 |
| 586,155 | 7/1897 | Bascom | 36/29 |
| 745,793 | 12/1903 | Corman . | |
| 850,327 | 4/1907 | Tauber | 36/26 |
| 897,920 | 9/1908 | McIntyre . | |
| 1,011,460 | 12/1911 | Maddocks | 36/29 |
| 1,193,608 | 8/1916 | Poulson . | |
| 1,278,320 | 9/1918 | Ellithorpe | 36/35 B |
| 1,605,985 | 11/1926 | Rasmussen | 36/29 X |
| 1,977,695 | 10/1934 | Pinaud . | |
| 2,080,499 | 10/1935 | Nathansohn . | |
| 2,532,742 | 12/1950 | Stoiner | 36/35 B |
| 2,549,343 | 4/1951 | Stoiner | 36/29 |
| 2,605,560 | 8/1952 | Gouabault | 36/29 |
| 2,677,904 | 5/1954 | Reed | 36/29 |
| 2,863,230 | 12/1958 | Cortina | 36/29 |
| 3,044,190 | 7/1962 | Urbany | 36/29 |
| 3,225,463 | 12/1965 | Burnham . | |
| 3,871,117 | 3/1975 | Richmond et al. | 36/29 X |
| 4,008,530 | 2/1977 | Gager | 36/28 |
| 4,071,963 | 2/1978 | Fukuoka | 36/3 B |
| 4,129,951 | 12/1978 | Petrosky | 36/29 |
| 4,229,889 | 10/1980 | Petrosky | 36/29 |
| 4,423,735 | 1/1984 | Comparetto . | |

FOREIGN PATENT DOCUMENTS

| | | | |
|---|---|---|---|
| 643881 | 6/1964 | Belgium . | |
| 73695 | 8/1917 | Fed. Rep. of Germany | 36/29 |
| 871261 | 5/1953 | Fed. Rep. of Germany . | |
| 1287477 | 1/1969 | Fed. Rep. of Germany . | |
| 336981 | 2/1904 | France | 36/29 |
| 379493 | 11/1907 | France | 36/29 |
| 448945 | 10/1912 | France | 36/29 |
| 720257 | 2/1932 | France . | |
| 721492 | 3/1932 | France | 36/29 |
| 1461743 | 12/1966 | France . | |
| 70141 | 8/1914 | Switzerland | 36/29 |
| 16143 | of 1892 | United Kingdom | 36/29 |
| 13911 | of 1893 | United Kingdom | 36/29 |
| 16240 | of 1893 | United Kingdom | 36/29 |
| 17254 | of 1895 | United Kingdom | 36/29 |
| 7441 | of 1907 | United Kingdom | 36/29 |
| 1337 | of 1912 | United Kingdom | 36/29 |
| 338266 | 11/1930 | United Kingdom . | |
| 440398 | 10/1934 | United Kingdom | 36/29 |

*Primary Examiner*—Paul T. Sewell
*Assistant Examiner*—Thomas P. Hilliard
*Attorney, Agent, or Firm*—Emrich & Dithmar

[57] ABSTRACT

A thrust producing shoe sole and heel having fluid-proof cavities respectively located in the heel portion and in the sole portion which underlies the metatarsal ball area of a foot for which the sole and heel is sized, the two cavities being connected by a restricted passageway. The material underlying the two cavities at the bottom of the sole and heel is resilient and wear-resistant. Fluid, either gas or liquid, is contained within the cavities and passageway in such pressure and amount as to cause bulges below the normal bottoms of the sole and heel, whereby at rest a foot on the sole and heel is cushioned comfortably on the fluid in the bulges, and in walking fluid under bulge producing pressure alternates through the passageway between the two cavities, producing shock absorption and an alternate lifting effect by the bulges which provides forward thrust both in the heel portion and the metatarsal ball area that facilitates walking.

18 Claims, 2 Drawing Sheets

THRUST PRODUCING SHOE SOLE AND HEEL

Matter enclosed in heavy brackets [ ] appears in the original patent but forms no part of this reissue specification; matter printed in italics indicates the additions made by reissue.

BACKGROUND OF THE INVENTION

This invention relates to a thrust producing shoe sole and heel suitable for use on shoes designed for men, women and children, and more particularly, to a shoe sole and heel having resilient bulges in the heel portion and in the metatarsal ball area of the sole portion.

The resilient bulges extend below the bottoms of the heel portion and metatarsal ball area of the sole, and thus in standing and walking come in contact with the walk surface. The bulges are defined by resilient bottom walls of cavities in the heel portion and sole portion of the sole and heel, and the two cavities are connected by a restricted passageway. The cavities and restricted passageway contain fluid, either gas or liquid, in such pressure and amount as to create the aforesaid bulges.

When at rest, the foot of a wearer of the sole and heel of the invention is cushioned comfortably on the pressurized fluid in the bulges, and in walking fluid under bulge producing pressure alternates through the passageway between the heel portion and metatarsal ball area bulges, producing shock absorption and an alternate lifting effect by the bulges which provides forward thrust, both in the heel portion and in the metatarsal ball area, that facilitates walking.

Applicants have conducted a prior art investigation of pertinent U.S. patents, and list the following as known to them: U.S. Pat. Nos. 508,034; 2,605,560; 547,645; 2,863,230; 586,155; 3,044,190; 850,327; 3,871,117; 1,605,985; 4,071,963. Copies of these patents are being filed with this application.

The prior patents above cited disclose shoe soles and heels embodying pneumatic or hydraulic features of one kind or another, but applicants find that no one of them is directed to a thrust producing shoe sole and heel such as here disclosed and claimed.

SUMMARY OF THE INVENTION

The thrust producing shoe sole and heel of the invention comprises a sole and heel member including a heel portion having a first cavity, the member also having a generally transverse second cavity underlying the metatarsal ball area of a foot for which the member is sized. A restricted passageway connects the first and second cavities to permit fluid to flow back and forth between the cavities.

Cavity closing material overlies the first and second cavities and is secured to the sole and heel member in fluid-proof manner. The walls of the cavities at the bottoms of the sole and heel member are resilient and wear-resistant.

The fluid-proof cavities and the restricted passageway contain fluid under such pressure if a gas, or in such amount if a liquid, as to create bulges below the bottoms of said sole and heel member, whereby at rest a foot on the sole and heel member is cushioned comfortably on the fluid in the bulges at the heel portion and the metatarsal ball area, and in walking fluid under bulge producing pressure alternates through said passageway between the heel portion and the metatarsal ball area bulges, producing shock absorption and an alternate lifting effect by the bulges which provides forward thrust both in the heel portion and the metatarsal ball area that facilitates walking.

In more detailed aspect, the peripheral walls of the first and second cavities are undercut in tapering manner from the cavity openings to the bottoms of the cavities, whereby the peripheral walls are wedge-shaped in cross-section, the cavity closing material being secured to the sole and heel member in general alignment with the undercuts, whereby stresses produced by the fluid in the cavities react as shear stresses rather than peel stresses at the junctions of the sole and heel member with the cavity closing material, and thus assure prolonged adhesion at the junctions.

The aforesaid second cavity is generally rectangular in outline and generally the same shape and area as the metatarsal ball area of a foot for which the sole and heel member is sized. This second cavity desirably is located longitudinally of the sole and heel member such that the transverse center line of the cavity is positioned a short distance, for example, about ¼ inch, rearwardly of the transverse center line of the metatarsal ball area of the foot.

Other features and advantages of the invention, including so-called buttons associated with the cavity walls at the bottom of the sole and heel member and sizes of the cavities and restricted passageway, will become apparent as the description proceeds, reference being had to the accompanying drawings wherein preferred embodiments of the invention are shown. It is to be understood that the description and drawings are exemplary only, and that the scope of the invention is to be measured by the appended claims.

DESCRIPTION OF THE PREFERRED EMBODIMENTS

Figure 1:
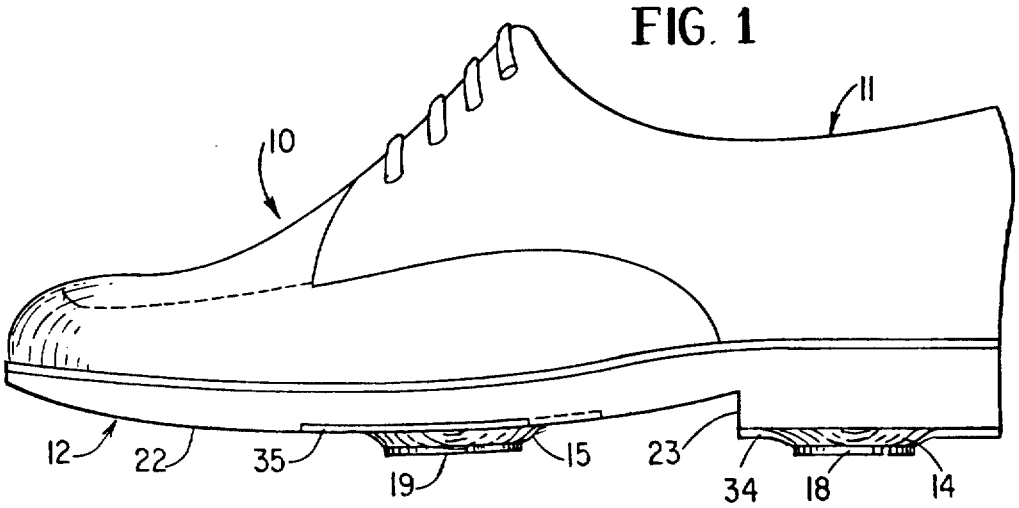
FIG. 1 is a side elevational view of a shoe embodying the thrust producing sole and heel of the invention.

Referring to the drawings, FIG. 1 illustrates a conventional men's shoe except for the sole and heel structure which embodies the present invention. Thus, shoe 10 includes a more or less conventional upper portion 11 and sole and heel 12 embodying the invention. As mentioned, sole and heel 12 is suitable for shoes designed for men, women and children.

Figure 2:
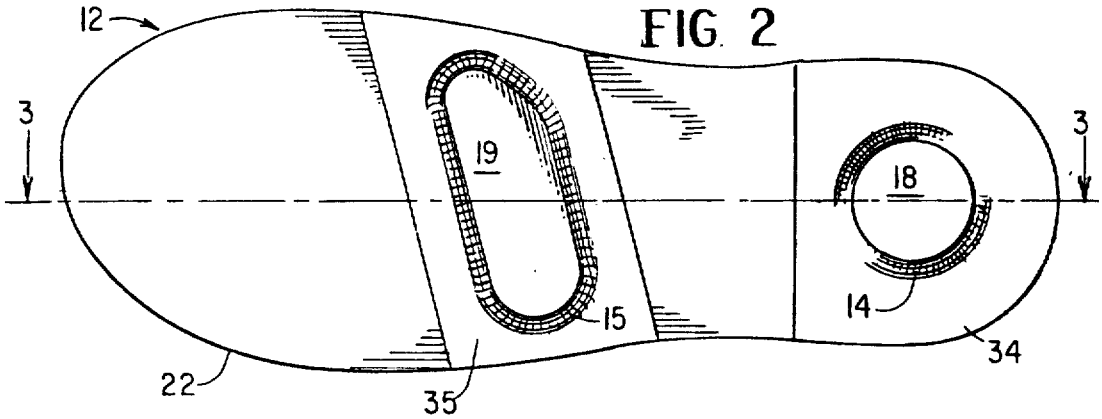
FIG. 2 is a bottom view of the shoe sole and heel shown in FIG. 1.

Still referring to FIG. 1, sole and heel 12 has a bulge 14 underlying the shoe heel portion and a bulge 15 underlying the metatarsal ball area of a foot for which shoe 10 is sized. In the form of the invention shown in FIGS. 1 and 2, the bottoms of bulges 14 and 15 respectively comprise so-called buttons 18 and 19. These buttons will be described later in greater detail.

Figure 3:
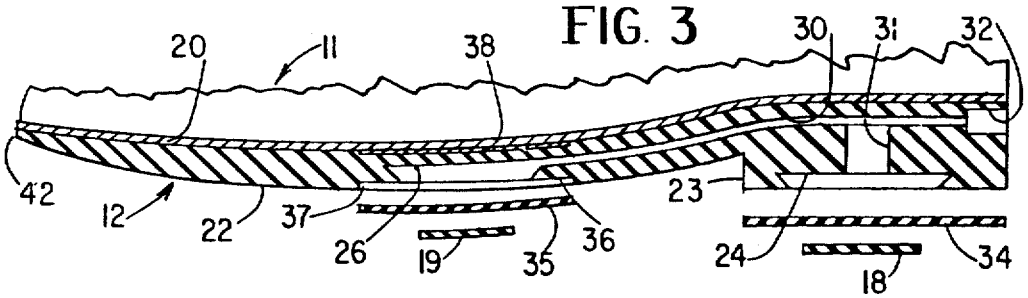
FIG. 3 is an exploded sectional view of the shoe sole and heel taken on line 3—3 of FIG. 2.

Referring now to FIG. 3, the several parts of one embodiment of the sole and heel invention are shown in section in exploded manner. Upper shoe portion 11, as shown, includes a conventional midsole 20 to which the sole and heel 12 of the invention is attached.

Subject thrust producing shoe sole and heel 12 includes sole and heel member 22 of suitable shoe sole and heel material, for example, natural or synthetic rubber. Heel portion 23 has a first cavity 24 therein, cavity 24 as illustrated being in the bottom of the heel portion. Alternatively, a cavity opening toward the top of the heel portion also is contemplated.

Sole and heel member 22 in the sole portion has a generally transverse cavity 26 therein underlying only the metatarsal ball area of a foot for which member 22 is sized. As shown, cavity 26 is in the bottom of member 22, but it is contemplated, alternatively, that the cavity opening may be directed toward the top of member 22.

A restricted passageway 30 connects first cavity 24 and second cavity 26, there being a short passageway 31 in heel portion 23 connecting restricted passageway 30 and cavity 24. In the form of the invention shown in FIG. 3, passageway 30 terminates at the rear in a valve element generally designated 32. As will be understood, a valve element is optional in that fluid may be introduced by so-called valveless mechanisms insertable directly into a cavity through the sole and heel material.

Cavity closing material 34 overlies first cavity 24, and cavity closing material 35 overlies second cavity 26, the material in both cases being secured to the sole and heel member 22 in fluid-proof manner. As shown, sole and heel member 22 is relieved at 36 and 37 around cavity 26 so that material 35 may be inlaid with respect to member 22. As shown, material 34 is co-extensive with the area of heel portion 23.

Cavity closing material 34 and 35 has resilience so as to permit the bulges 14 and 15 previously referred to, and, needless to say, also has a wear-resistant quality.

Previously referred to buttons 18 and 19 also are illustrated in FIG. 3. These buttons respectively are smaller in area than the area of the cavities 24 and 26 with which they are generally aligned, whereby, as will been seen, in walking the buttons function as pistons within the cavities and thus enhance the forward thrust characteristics of the shoe sole and heel, help keep the foot level laterally, reinforce the associated walls of the cavities in regions of stress and improve the shoe and heel from the standpoint of resistance to wear.

FIG. 3 also shows a non-resilient plate 38 secured to the upper surface of sole and heel member 22 in general alignment with second cavity 26, whereby any tendency of member 22 to permit a discomforting upward bulge in the metatarsal ball area of a foot above cavity 26 positively is prevented.

Having generally described the structure of the shoe sole and heel 12 of the invention, the final feature is the presence of fluid in the cavities 24 and 26 and in the restricted passageway 30 connecting the cavities. As previously mentioned, the fluid may be either gas or liquid. Gas, due to its compressibility and easy pressure regulation offers advantages in the invention not possessed by liquid. However, liquid possesses advantages, and it is contemplated that liquid will be used in some instances.

Referring again to FIG. 1, gas under pressure or liquid in requisite amount is inserted in the cavities 24 and 26 and in restricted passageway 30 so as to create the illustrated bulges 14 and 15. The sizes of the bulges desirably are established with due regard to the weight of the user.

In taking a normal step, heel bulge 14 first engages the walk surface, and the bulge accordingly is reduced in size, gas pressure or liquid being communicated to the bulge 15 which tends to enlarge. In completing the step, the bulge 15 engages the walk surface and transfers gas pressure or liquid to heel bulge 14, thereby increasing the size of bulge 14. This size increase occurs slightly before and as the heel normally is being lifted from the walk surface and thereby produces an upward and forward thrust at the heel.

It has been found that a secondary thrust simultaneously occurs in the metatarsal ball area as the foot rocks forward. This secondary thrust is explained by the fact that the fluid in cavity 26, as the foot rocks forwardly, travels from the front of bulge 15 to the rear of bulge 15, thereby causing an enlargement at the rear of the bulge which produces an upward and forward thrust in that region. Restricted passageway 30 cooperates in producing this secondary thrust.

Figure 4:
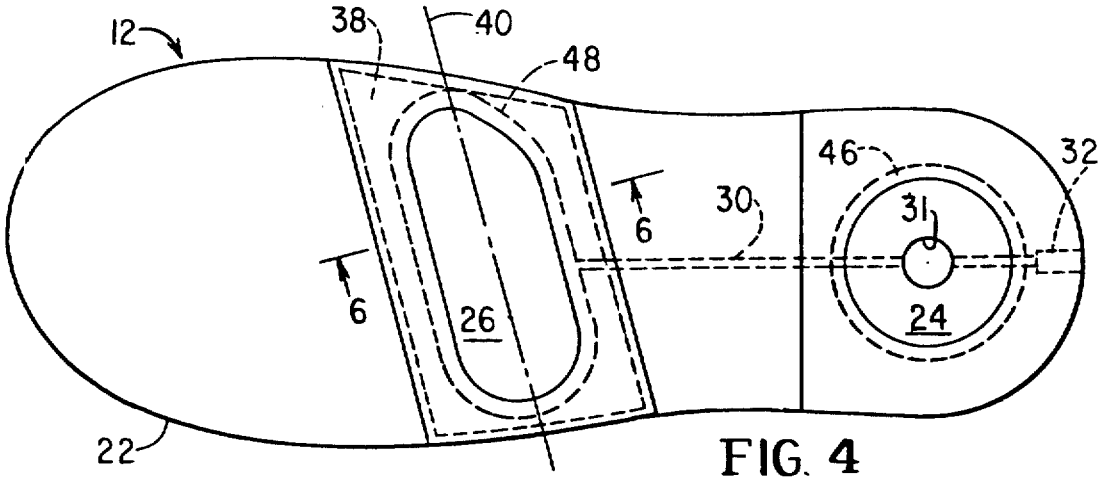
FIG. 4 is a bottom view of the shoe sole and heel of the invention with certain parts removed for clarity and certain features shown in broken line.

Referring now to FIG. 4, the bottom of sole and heel 12 of the invention is illustrated with cavity closing material 34 and 35 removed. Buttons 18 and 19 which in the FIGS. 1-3 form of the invention are associated with the cavity closing material also are not shown.

FIG. 4 well illustrates first cavity 24, second cavity 26 and restricted passageway 30 (broken line). Second cavity 26, as shown in FIG. 4, is generally rectangular in outline and of generally the same shape and area as the metatarsal ball area of a foot for which the sole and heel is sized. It has been found that second cavity 26 best should be located longitudinally of sole and heel member 22 such that the transverse center line 40 of the cavity is positioned about ¼ inch rearwardly of the transverse center line of the metatarsal ball area of the foot for which the member is sized.

As shown in FIGS. 3 and 4, first cavity 24 is smaller in volume than second cavity 26. Based on experience to date, a desirable ratio of the volumes of the first and second cavities is of the order of about 1 to 3. It further has been found that a desirable cross-sectional area of restricted passageway 30 is in the range of about 0.01 to 0.02 square inch.

Referring again to FIG. 3, sole and heel member 22 desirably tapers in thickness from the thickness at the forward margin of second cavity 26 to a reduced thickness at the forward end 42 of the member, whereby the aforesaid secondary forward thrust produced in the metatarsal ball area is enhanced by the extended forward rocking action of member 22 permitted by the taper in the toe region of the member. The reduced thickness at the forward end 42 of member 22 desirably is in the range of about 0.10 to 0.20 inch.

The sectional views of FIGS 5-8, taken generally on the line 6—6 of FIG. 4, illustrate various structural modifications of the invention as well as functional aspects. Each of these figures shows metatarsal second cavity 26 and associated cavity closing material 35, but the modifications also are applicable to first cavity 24 and cavity closing material 34. A vertical broken line 45 bisects FIGS. 5-8, dividing each cavity 26 in the middle. The drawings at the left of line 45 illustrate conditions with bulges 15, while the drawings at the right of line 45 illustrate conditions when on a walk surface, that is, the bulges have been flattened.

Referring again to FIG. 3, it will be noted that the illustrated peripheral walls of first cavity 24 and second cavity 26 are undercut in tapering manner from the cavity openings to the cavity bottoms, whereby the periphery cavity walls are wedged shaped in cross-section. These tapering peripheral walls are unnumbered in FIG. 3, but will be referred to in connection with FIGS. 6–8. The lateral extent of the undercuts in cavities 24 and 26 are shown relatively in FIG. 4 by broken lines 46 and 48 respectively.

Cavity closing material 34 and 35 is secured to sole and heel member 22 in general alignment with the undercuts, whereby stresses produced by the fluid in the cavities react as shear stresses rather than peel stresses at the junctions of member 22 with the cavity closing material 34 and 35. This relationship between the cavity closing material 34 and 35 with member 22 assures prolonged adhesion at the junctions.

Figure 5:
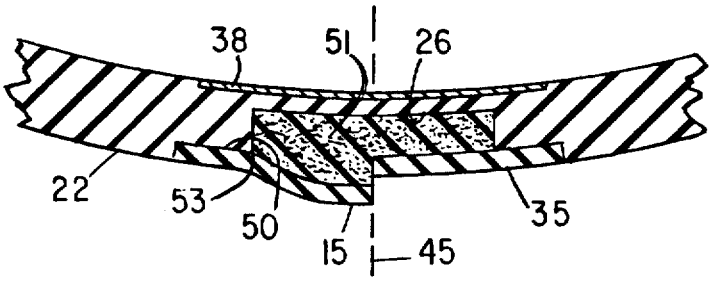
FIGS. 5–8 are sectional views taken generally on line 6—6 of FIG. 4, the FIGS. being centrally divided to illustrate both the presence and absence of the bulge condition. Further, the FIGS. show various modifications falling within the scope of the invention. These modifications will be referred to when the figures are described in detail.

In FIG. 5 the peripheral wall 50 of cavity 26 is not undercut in tapering manner as just described. Rather, the wall is vertical. Further, cavity 26 is filled with a porous resilient material 51 such as sponge rubber or the like. Material 51 affords a degree of support at the cavities in the event of a loss of fluid pressure. In this form of the invention, heel cavity 24 may or may not be filled with a porous resilient material, as desired.

Still referring to FIG. 5, and particularly to the left side thereof showing bulge 15, it will be noted that a major stress line designated 53 exists at the junction of peripheral wall 50 and cavity closing material 35. When bulge 15 is present, the stress is a peel stress which tends to strip cavity closing material 35 from member 22. This stress is generally similar to that employed when peeling an orange with the thumb. Resistance to separation exists, but is overcome rather readily by peeling action.

Figure 6:
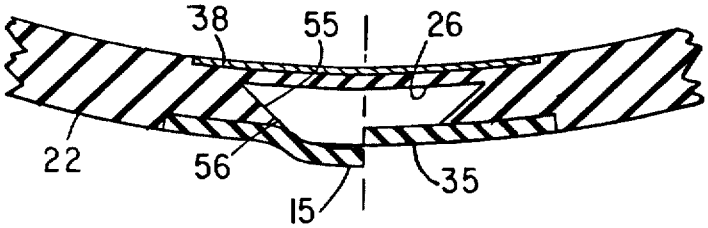

FIG. 6 illustrates cavity 26 with an undercut periphery wall 55 such as shown in FIGS. 3 and 4. Referring to the left side showing bulge 15, it will be noted that the tapered edge 56 of undercut wall 55 is displaceable to conform generally with the bulged shape of cavity closing material 35. The stress between cavity closing material 35 and the tapered edge 56 is a shear stress, that is, the tendency of the stress to cause separation of material 35 and member 22 is by sliding material 35 with respect to member 22. The resistance to separation is greater with this shear stress relationship than with the peel stress relationship described above in connection with FIG. 5.

Figure 7:
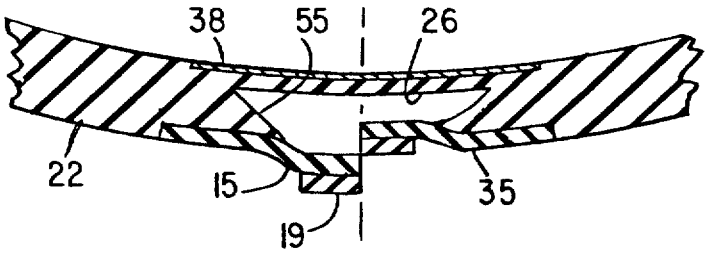

FIG. 7 is generally like FIG. 6 except that button 19 is applied to the exterior of cavity closing material 35. As previously mentioned, button 19, which may be a thickened portion of material 35 or a piece of different material, is sized to be slightly smaller in area than the opening of cavity 26 When member 22 engages a walk surface, as indicated at the right in FIG. 7, button 19 functions somewhat as a piston within cavity 26, thereby quickly reducing the volume of cavity 26 and effecting a rapid transfer of pressurized fluid from metatarsal cavity 26 to heel cavity 24.

The form of the invention employing an exterior button 19 with cavity 26 generally will have a counter part exterior button 18 in connection with heel cavity 24. As previously mentioned, buttons 19 and 18, in addition to functioning as pistons within the cavities and thus enhancing the forward thrust characteristics, help keep the foot level laterally, reinforce the associated cavity walls in regions of stress and improve resistance to wear. The buttons themselves have high resistance to wear, little or no resilience and preferably a thickness of the order of about 1/16 to ⅛ inch.

Figure 8:
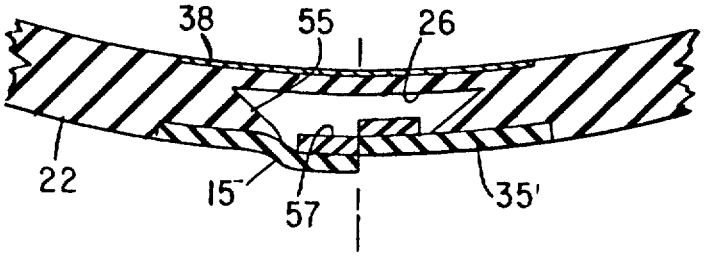

FIG. 8 is generally like FIG. 7 except that button 57 is located interiorly of cavity closing material 35. Again, button 57 functions as a piston within cavity 26 and thus enhances the forward thrust characteristics and, like exterior button 19, helps keep the foot level laterally, reinforces the cavity wall in regions of stress and improves resistance to wear. In this form of the invention, a similar interior button is used with heel cavity 24. Internal buttons have low resilience, and preferably a thickness of the order of 1/16 and ⅛ inch.

From the above description, it is believed that the construction and advantages of the invention will be readily apparent to those skilled in the art.

Various changes in detail may be made without departing from the spirit or losing the advantages of the invention.

Having thus described the invention, what is claimed as new and desired to be secured by Letters Patent of is:

1. A thrust producing shoe sole and heel, comprising:

[a] *an outer* sole and heel member including a heel portion having a first cavity therein, said member having a generally transverse second cavity therein underlying only the metatarsal ball area of a foot for which said member is sized;

said sole and heel member having a restricted passageway connecting said first and second cavities;

cavity closing material overlying said first and second cavities and secured to said sole and heel member in fluid-proof manner, the walls of said cavities at the [bottoms] *bottom* of said sole and heel member being resilient and [wear-resistant] *resistant to wear caused by contact with a support surface during use*; and fluid in said cavities and said passageway under such pressure as to create bulges below the [bottoms] *bottom* of said sole and heel member;

whereby at rest a foot on said sole and heel member is cushioned comfortably on the pressurized fluid in the bulges at the heel portion and the metatarsal ball area, and in walking fluid under bulge producing pressure alternates through said passageway between the heel portion and metatarsal ball area bulges, producing shock absorption and an alternate lifting effect by the bulges which provides forward thrust both in the heel portion and the metatarsal ball area that facilitates walking.

2. The thrust producing shoe sole and heel of claim 1 wherein the peripheral walls of said first and second cavities are undercut in tapering manner from the cavity openings to the bottoms of said cavities, whereby the cavity walls are wedge-shaped in cross-section, said cavity closing material being secured to said sole and heel member in general alignment with the undercuts, whereby stresses produced by the pressurized fluid in the cavities react as shear stresses rather than peel stresses at the junctions of said sole and heel member with said cavity closing material, and thus assure prolonged adhesion at the junctions.

3. The thrust producing shoe sole and heel of claim 1 wherein said second cavity is generally rectangular in outline and of generally the same shape and area as the metatarsal ball area of a foot for which said sole and heel member is sized, said second cavity located longitudinally of said sole and heel member such that the transverse center line of said second cavity is positioned about ¼ inch rearwardly of the transverse center line of said metatarsal ball area.

4. The thrust producing shoe sole and heel of claim 1 with the addition of a [non-resilient] plate secured to the upper surface of said sole and heel member in general alignment with said second cavity, [whereby] *said plate being sufficiently non-resilient that* any tendency of said sole and heel member to permit a discomforting upward bulge in the metatarsal ball area of a foot above said cavity positively is prevented.

5. The thrust producing shoe sole and heel of claim 1 wherein said pressurized fluid is a gas.

6. The thrust producing shoe sole and heel of claim 1 wherein said pressurized fluid is a liquid.

7. The thrust producing shoe sole and heel of claim 1 with the addition of a valve in said sole and heel member for admitting pressurized fluid into said cavities to create bulges of desired size.

8. The thrust producing shoe sole and heel of claim 1 with the addition of a first button on the exterior of said first cavity wall at the bottom of said sole and heel member and a second button on the exterior of said second cavity wall at the bottom of said sole and heel member, the respective buttons being slightly smaller in area than the area of the cavities with which they are generally aligned, whereby in walking said buttons function as pistons within said cavities and thus enhance the forward thrust characteristics, help keep the foot level laterally, reinforce the associated walls in regions of stress and improve resistance to wear.

9. The thrust producing shoe sole and heel of claim 8 wherein said buttons have a thickness of the order of 1/16 to ⅛ inch.

10. The thrust producing shoe sole and heel of claim 1 with the addition of a first button on the interior of said first cavity wall at the bottom of said sole and heel member and a second button on the interior of said second cavity wall at the bottom of said sole and heel member, the respective buttons being slightly smaller in area than the area of the cavities with which they are generally aligned, whereby in walking said buttons function as pistons within said cavities and thus enhance the forward thrust characteristics, help keep the foot level laterally, reinforce the associated walls in regions of stress and improved resistance to wear.

11. The thrust producing shoe sole and heel of claim 10 wherein said buttons have a thickness of the order of 1/16 to ⅛ inch.

12. The thrust producing shoe sole and heel of claim 1 wherein the volume of said first cavity is less than the volume of said second cavity.

13. The thrust producing shoe sole and heel of claim 1 wherein the ratio of the volumes of said first and second cavities is of the order of about 1 to 3.

14. The thrust producing shoe sole and heel of claim 13 wherein the cross-sectional area of said passageway is in the range of about 0.01 to 0.02 square inch.

15. The thrust producing shoe sole and heel of claim 1 wherein said sole and heel member tapers in thickness from the thickness at the forward margin of said second cavity to a reduced thickness at the forward end of said member, whereby the forward thrust produced in the metatarsal ball area is enhanced by the extended forward rocking action of said member permitted by the taper in the toe region of said member.

16. The thrust producing shoe sole and heel of claim 15 wherein the reduced thickness at the forward end of said sole and heel member is in the range of about 0.10 to 0.20 inch.

*17. The thrust producing shoe sole and heel of claim 1, wherein said cavity closing material is disposed along the bottoms of said first and second cavities.*

*18. The thrust producing shoe sole and heel of claim 17, wherein said cavity closing material is resilient and resistant to wear caused by contact with a support surface during use.*

* * * * *